(12) United States Patent
Fly

(10) Patent No.: US 6,997,658 B2
(45) Date of Patent: Feb. 14, 2006

(54) ALIGNMENT PIN AND FASTENER WITH BI-DIRECTIONAL CLAMPING

(76) Inventor: David E. Fly, 316 W. 21$^{st}$ Ave., Menomonie, WI (US) 54751

( * ) Notice: Subject to any disclaimer, the term of this patent is extended or adjusted under 35 U.S.C. 154(b) by 0 days.

(21) Appl. No.: 10/689,490

(22) Filed: Oct. 20, 2003

(65) Prior Publication Data

US 2005/0084361 A1     Apr. 21, 2005

(51) Int. Cl.
*F16B 39/00* (2006.01)
*F16B 21/00* (2006.01)
(52) U.S. Cl. .................. 411/107; 411/58; 411/549; 411/349; 411/350; 24/458; 403/222
(58) Field of Classification Search ............... 403/222, 403/223; 24/457, 458; 411/107, 58, 549–553, 411/349–350
See application file for complete search history.

(56) References Cited

U.S. PATENT DOCUMENTS

| | | | |
|---|---|---|---|
| 2,877,815 A | 3/1959 | Fonken | |
| 3,172,329 A * | 3/1965 | Setzler | 411/41 |
| 3,570,836 A | 3/1971 | Pettavel | |
| 3,571,864 A * | 3/1971 | Oger | 411/349 |
| 3,747,168 A * | 7/1973 | Snarskis | 411/349 |
| 3,893,365 A * | 7/1975 | Gross | 411/15 |
| 3,956,803 A * | 5/1976 | Leitner | 411/349 |
| 4,232,880 A * | 11/1980 | Dickerson et al. | 280/86.756 |
| 4,509,772 A * | 4/1985 | Drotar et al. | 280/86.756 |
| 4,735,404 A | 4/1988 | Blümle | |
| 4,789,287 A * | 12/1988 | Le | 411/107 |
| 4,827,609 A * | 5/1989 | Kawecki | 29/832 |
| 4,867,427 A | 9/1989 | Cunningham | |
| 5,073,075 A * | 12/1991 | Duran | 411/552 |
| 5,104,141 A * | 4/1992 | Grove et al. | 280/86.753 |
| 5,193,956 A | 3/1993 | Duran | |
| 5,224,806 A | 7/1993 | Duran | |
| 5,275,515 A | 1/1994 | Leifsen | |
| 5,284,408 A | 2/1994 | Duran et al. | |
| 5,346,349 A * | 9/1994 | Giovannetti | 411/549 |
| 5,394,594 A | 3/1995 | Duran | |
| 5,607,271 A * | 3/1997 | Salice | 411/349 |
| 5,901,763 A | 5/1999 | You | |
| 6,019,359 A | 2/2000 | Fly | |
| 6,024,350 A | 2/2000 | Price et al. | |
| 6,148,881 A | 11/2000 | Valenzuela | |
| 6,193,261 B1 | 2/2001 | Hahka | |
| 6,378,855 B1 | 4/2002 | Sawdon et al. | |
| 6,386,789 B1 | 5/2002 | Chausse et al. | |
| 6,659,513 B1 * | 12/2003 | Ramsauer | 292/66 |
| 2002/0020956 A1 | 2/2002 | Akizuki | |
| 2002/0108407 A1 | 8/2002 | Zapusher | |
| 2002/0159860 A1 | 10/2002 | Kenzler | |
| 2003/0017022 A1 | 1/2003 | Meyer | |
| 2003/0116902 A1 | 6/2003 | Phillips | |

* cited by examiner

*Primary Examiner*—Katherine Mitchell
(74) *Attorney, Agent, or Firm*—Robert J. Harter

(57) ABSTRACT

An alignment pin or fastener includes a radially eccentric part such that when the fastener is tightened, the eccentric part shifts radially to simultaneously align the holes of two plates in a radial direction and clamp the two plates together in an axial direction. The bi-directional fastener includes two heads at opposite ends of a shaft, wherein the two plates become sandwiched and clamped between the two heads. The shaft and the two heads remain fixed relative to each other, so turning one head turns the other. This allows the fastener to be tightened even when only one of the heads is accessible.

17 Claims, 7 Drawing Sheets

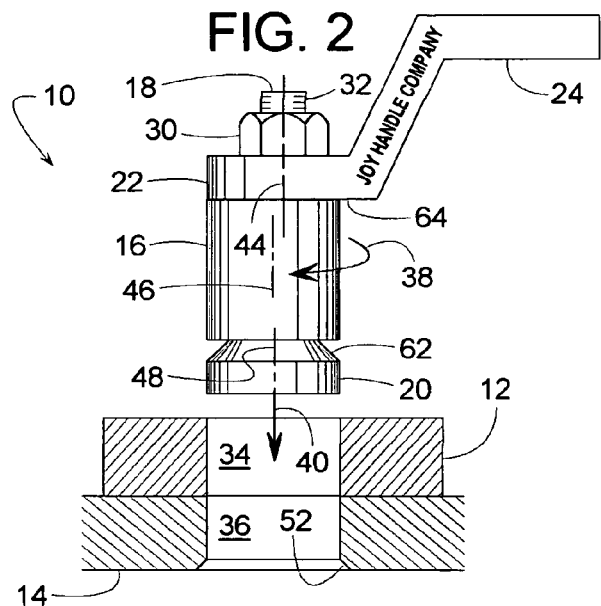
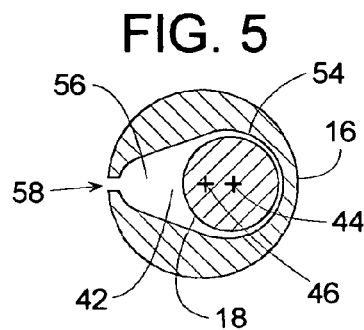
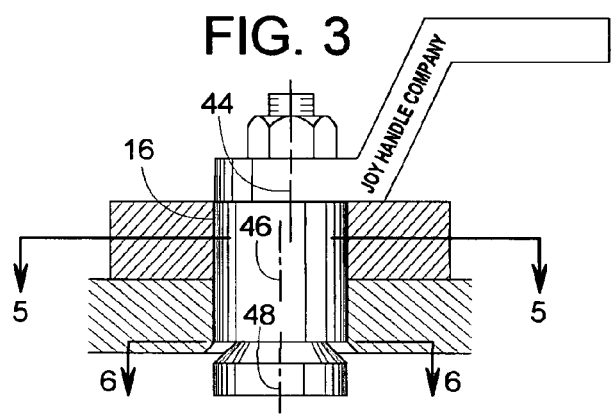
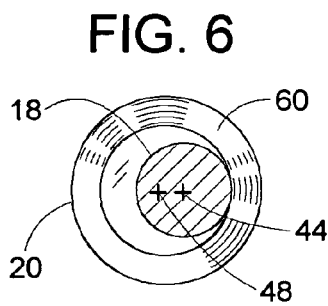
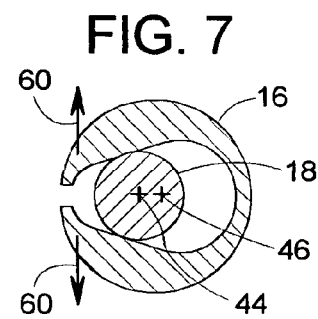
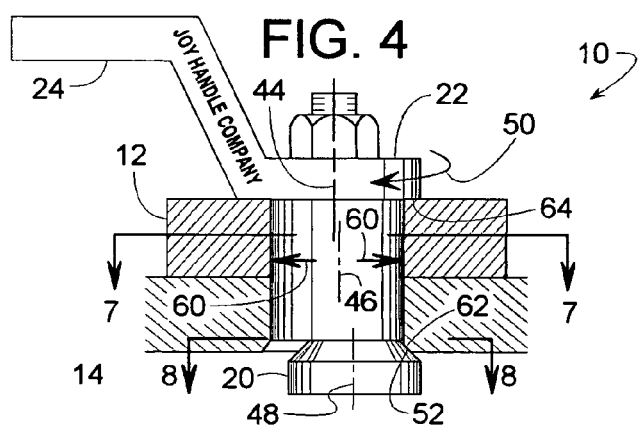
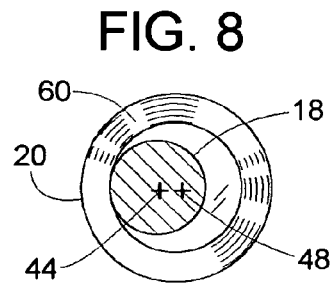

ALIGNMENT PIN AND FASTENER WITH BI-DIRECTIONAL CLAMPING

BACKGROUND OF THE INVENTION

1. Field of the Invention

The subject invention generally relates to expanding diameter alignment pins and fasteners and more specifically to an alignment pin or fastener that clamps both radially and axially.

2. Description of Related Art

In many manufacturing processes, such as machining and welding, fixtures are often used to accurately position and hold the work piece to a worktable. Worktables often have an array of holes that allow specially designed fasteners or alignment pins to quickly and accurately fasten the fixtures and/or the work piece to the table. Common examples of such fasteners or pins include collets, ball lock pins, and adjustable diameter bolts. Such devices can be used not only for attaching fixtures and work pieces to tables, but they may also be used for other applications as well. Although the devices may have broad application, they do have their drawbacks.

Collets, typically include a threaded rod that screws into a tapered piece, which forces the exterior of the collet to expand radially as the threaded rod is tightened. Collets typically clamp and align in just a radial direction without providing any significant axial clamping. In some cases, operation of a collet requires access to both ends of the collet, which is not always available.

Ball lock pins usually comprise a screw that threads into a hollow pin. As the screw turns into the pin, the screw forces one or more balls radially outward from inside the pin. When the pin is inserted into a hole of some part, the radially protruding balls press against the part to hold the pin in place. Depending on the design, such ball lock pins have limited ability to clamp and align. Also, such pins usually include several precise parts that can be expensive to make and difficult to maintain in good operating condition. Moreover, actuating ball lock pins usually require many turns of the screw before the balls fully engage. This can take time, which is limited in high production applications. Lastly, in order for a ball lock pin to accurate align two parts, the parts themselves need to be accurately machined, which can be expensive.

An adjustable diameter bolt, as disclosed in U.S. Pat. No. 5,284,408 and other patents by Duran; comprises a series of internally actuated collets. Such a bolt includes several relatively small parts that may jamb when exposed to dirty environments such as welding or machining.

Consequently, a need exists for a quick-actuating alignment pin that can clamp radially and axially, and do so with only having to access one end of the pin.

SUMMARY OF THE INVENTION

To overcome the problems and limitations of current fasteners and alignment pins, it is an object of some embodiments of the invention to provide a dual-clamping fastener that clamps in both a radial and axial direction.

Another object of some embodiments is to provide such a dual-clamping fastener with the ability to be actuated with access from only one end of the fastener.

Another object of some embodiments is to provide a dual-clamping fastener with a head at opposite ends, wherein the two heads are turned in unison by a single handle.

Another object of some embodiments is to provide dual-head, dual-clamping fastener, wherein a handle could be attached to either head.

Another object of some embodiments is to provide such a dual-clamping fastener with a minimal number of parts.

Another object of some embodiments is to provide a dual-clamping fastener with a radially expandable sleeve that includes a single slit to ensure maximum circumferential contact with the two bores in which the fastener is inserted.

Another object of some embodiments is to provide a dual-clamping fastener that provides a snap-into-position feel as the fastener is actuated.

Another object of some embodiments is to simultaneously align and clamp two parts together.

Another object of some embodiments is to use a duel-clamping fastener to simultaneously align and clamp two parts together without having to use an additional separate tool.

One or more of these and/or other objects of the invention are provided by a fastener that includes radially eccentric parts such that when the fastener is actuated, at least one of the eccentric parts shifts radially to simultaneously provide alignment and clamping in both a radial and axial direction.

BRIEF DESCRIPTION OF THE DRAWINGS

FIG. 2 is a front view of the fastener of FIG. 1 showing the fastener being installed in one or more plates that shown in cross-section.

FIG. 3 is similar to FIG. 2 but showing the fastener in place and in a release position.

FIG. 4 is similar to FIG. 3 but showing the fastener in a lock position.

FIG. 5 is a cross-sectional view taken along an imaginary plane identified by line-5—5 of FIG. 3.

FIG. 6 is a cross-sectional view taken along line 6—6 of FIG. 3.

FIG. 7 is a cross-sectional view taken along line 7—7 of FIG. 4.

FIG. 8 is a cross-sectional view taken along line 8—8 of FIG. 4.

DESCRIPTION OF THE PREFERRED EMBODIMENT

Figure 1:
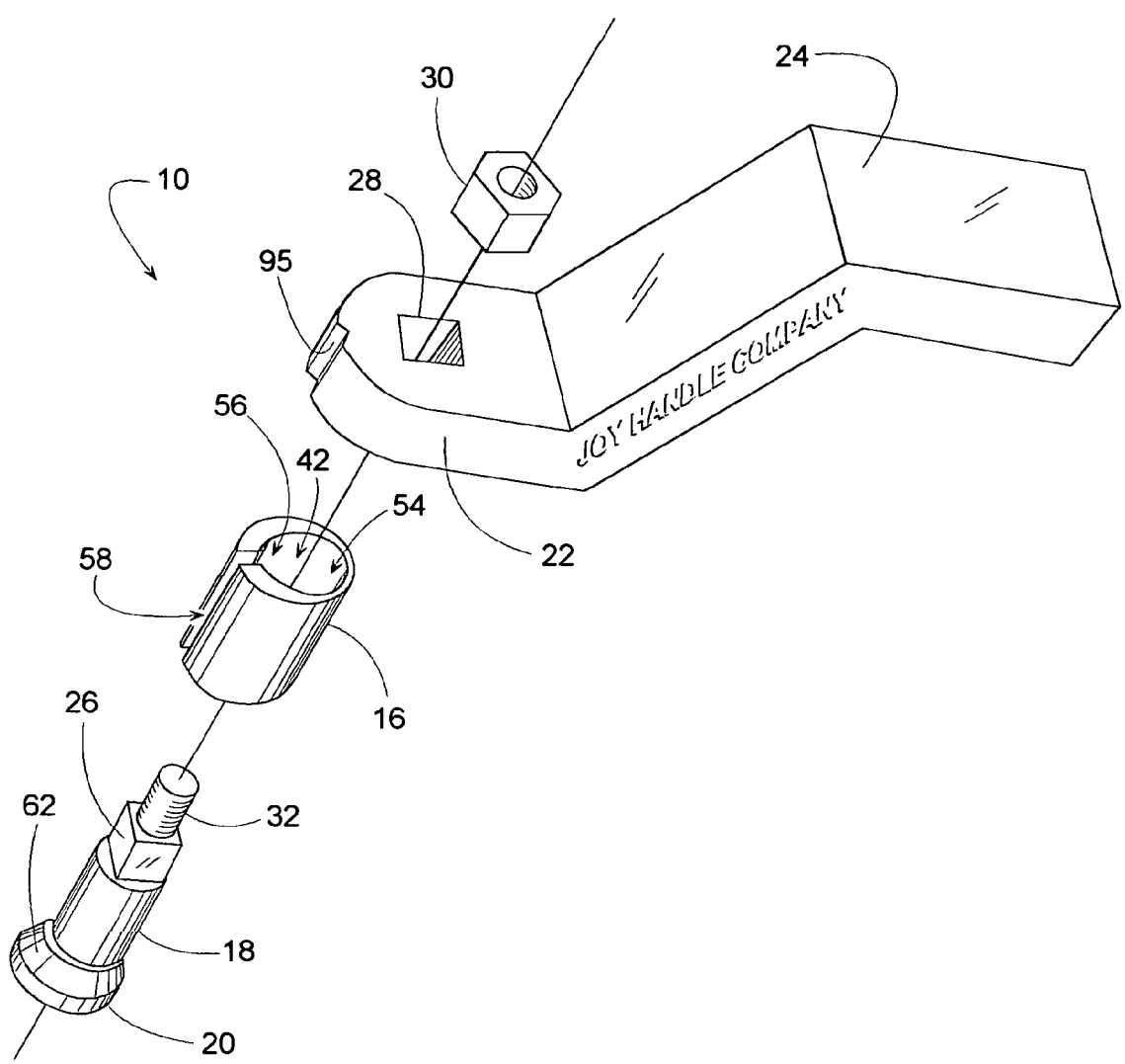
FIG. 1 is an exploded perspective view of a fastener according to one embodiment of the invention.

An alignment pin or a fastener 10 for radially aligning and axially clamping is shown in FIGS. 1–4. FIG. 1 shows an exploded perspective view of fastener 10, and FIGS. 2–4 show how fastener 10 can align and fasten an upper plate 12 to a lower plate 14.

Fastener 10 comprises a radially expandable sleeve 16 that fits over a shaft 18. Shaft 18 has a cam head 20 at one end and a clamp head 22 at an opposite end. For ease of use, a handle 24 may extend from clamp head 22 or cam head 20. In some cases, shaft 18 connects to clamp head 22 by inserting a square end 26 of shaft 18 into a mating square hole 28 in clamp head 22 and screwing a nut 30 onto a threaded end 32 of shaft 18. Of course, there are many other ways of connecting shaft 18, clamp head 22, and cam head 20 together so they move as a unit. Although various features of fastener 10 may vary, and the piece or pieces to which the fastener is attached may also vary, fastener 10 provides a good illustrative example of the invention's basic structure and function.

To operate fastener 10, a hole 34 in upper plate 12 is first roughly aligned with a hole 36 in lower plate 14, as shown in FIG. 2. Rotating sleeve 16 (see arrow 38) to be concentrically aligned with cam head 20 allows fastener 10 to be inserted (arrow 40) through holes 34 and 36, as shown in FIG. 3. A slit 58 can be aligned with alignment mark 95 (FIG. 1) in clamp head 22 or cam head 20 to help coaxially align sleeve 16 with cam head 20. Mark 95 can be a groove, a raised ridge, a flat line, or any mechanical or visual feature that helps align sleeve 16 with the rest of fastener 10. When properly aligned, an oblong hole 42 in sleeve 16 allows shaft 18 to be biased off to one side of sleeve 16, so a longitudinal centerline 44 of shaft 18 is radially offset to a longitudinal centerline 46 of sleeve 16, as shown in FIG. 5. FIG. 6 shows a longitudinal centerline of cam head 48 being radially offset to the shaft's centerline 44. As a result, when fastener 10 is in the position of FIG. 3, the sleeve's longitudinal centerline 46 and the cam head's longitudinal centerline 48 are coaxially aligned with holes 34 and 36, and the shaft's longitudinal centerline 44 is radially offset to the holes.

Next, to more accurately align holes 34 and 36, and to simultaneously and axially clamp pieces 12 and 14 together, handle 24 can be used to rotate clamp head 22, as indicated by arrow 50 of FIG. 4. The rotation can be a quick and short turn of 180-degrees or less. Since shaft 18 holds cam head 20 and clamp head 22 in a substantially fixed relationship with each other, shaft 18 and the two heads 20 and 22 rotate as one. Meanwhile, friction between sleeve 16 and the inner diameters of holes 34 and 36 resists the rotation of sleeve 16 within the holes as handle 24 rotates shaft 18 and heads 20 and 22. Rotating handle 24 forces cam head 20 radially against a lower edge 52 of piece 14. In reaction to that, shaft 18 moves from a release position of FIG. 5 to a clamp position of FIG. 7. More specifically, rotating handle 24 forces shaft 18 to move from a wider end 54 of opening 42 to a narrower end 56, where a full-length slit 58 exists in sleeve 16. The diameter of shaft 18 is wider than narrower end 56, so slit 58 enables shaft 18 to expand sleeve 16 radially, as indicated by arrows 60. The radial expansion of sleeve 16 is what accurately aligns holes 34 and 36. When shaft 18 is pressed into the narrower end 56 of opening 42, friction between shaft 18 and cylinder 16 helps hold fastener 10 in its clamped position.

In addition to the radial expansion of sleeve 16, an inclined cam surface 62 of cam head 20 pressing against lower edge 52 urges edge 52 to slide up along cam surface 62. This urges edge 52 to move closer to an axial clamping surface 64 of clamp head 22, whereby pieces 12 and 14 are axially clamped between cam surface 62 and axial clamping surface 64.

Figure 9:
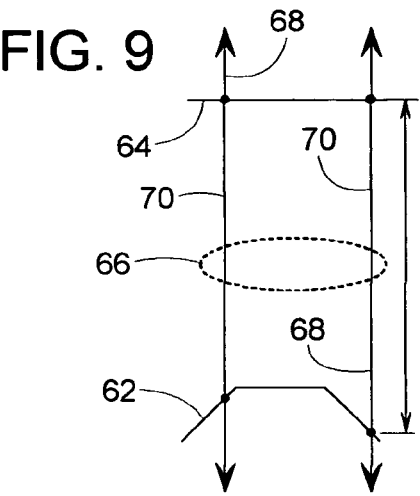
FIG. 9 is a geometric figure that helps illustrate the axial clamping feature of a fastener according to some embodiments of the invention.
Figure 10:
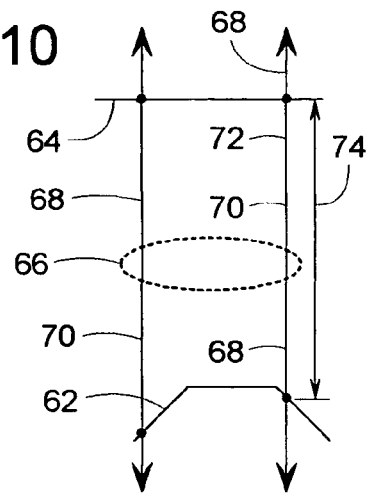
FIG. 10 is another geometric figure that helps illustrate the axial clamping feature of a fastener according to some embodiments of the invention.

To express this axial clamping feature geometrically, the unstressed outer diameter of sleeve 16 defines or lies along an imaginary cylinder 66, as shown in FIGS. 9 and 10. Cylinder 66 comprises an infinite number of parallel lines 68 of which at least some define a plurality of line segments 70 that terminate at axial clamping surface 64 and cam surface 62. The plurality of line segments 70 include a shortest line segment 72 having a length 74 that varies upon rotating sleeve 16 or cylinder 66 relative to cam head 20 and clamp head 22. The shortening of length 74 is what creates the axial clamping aspect of fastener 10.

Figure 11:
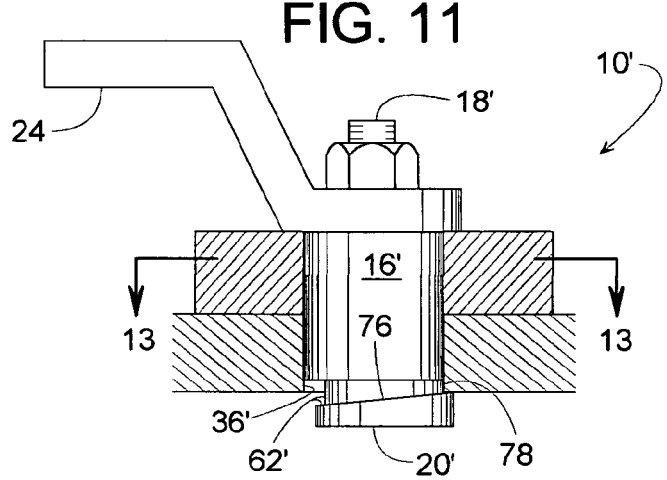
FIG. 11 is similar to FIG. 4 but showing another embodiment of a fastener in its lock position.

Although lower edge 52 of piece 14 is chamfered to broaden the contact area between cam surface 62 and edge 52, the lower edge of hole 36 does not necessarily have to be chamfered. The beveled surface 62 of cam head 20 can simply engage the sharp corner of a hole whose edge is not chamfered. This, however, would create an area of high stress concentration at the point where cam surface 62 meets the sharp edge. High stress concentrations can be avoided by providing a fastener 10' with a cam head 20' that has a modified cam surface 62', as shown in FIG. 11.

Figure 12:
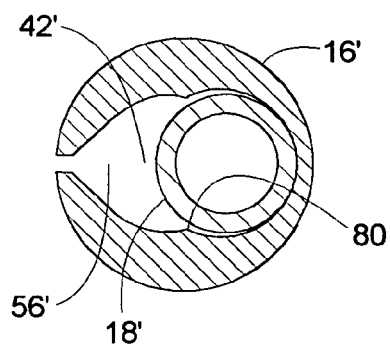
FIG. 12 is a cross-sectional view similar to FIG. 5 but taken along line 13—13; however, the view is when the fastener of FIG. 11 is in its release position as opposed to its actual illustrated lock position.
Figure 13:
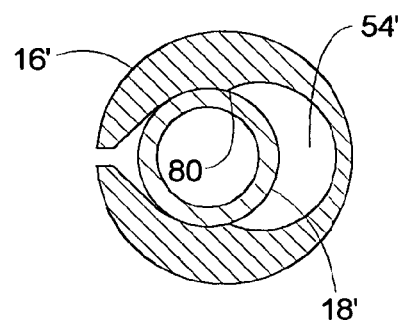
FIG. 13 is a cross-sectional view similar to FIG. 7 but taken along line 13—13 when the fastener of FIG. 11 is in its lock position.
Figure 14:
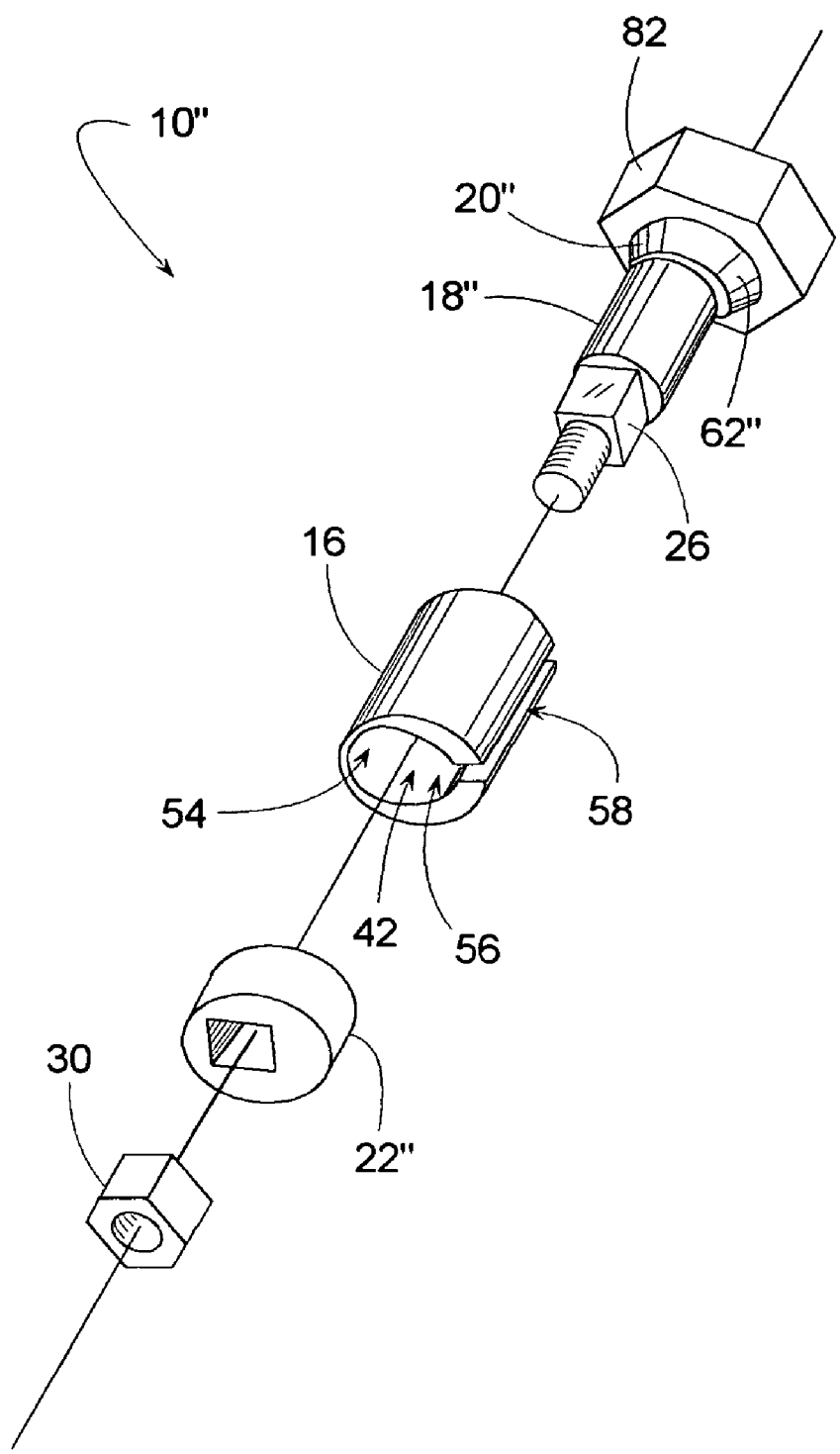
FIG. 14 is an exploded perspective view of a fastener according to another embodiment of the invention.
Figure 15:
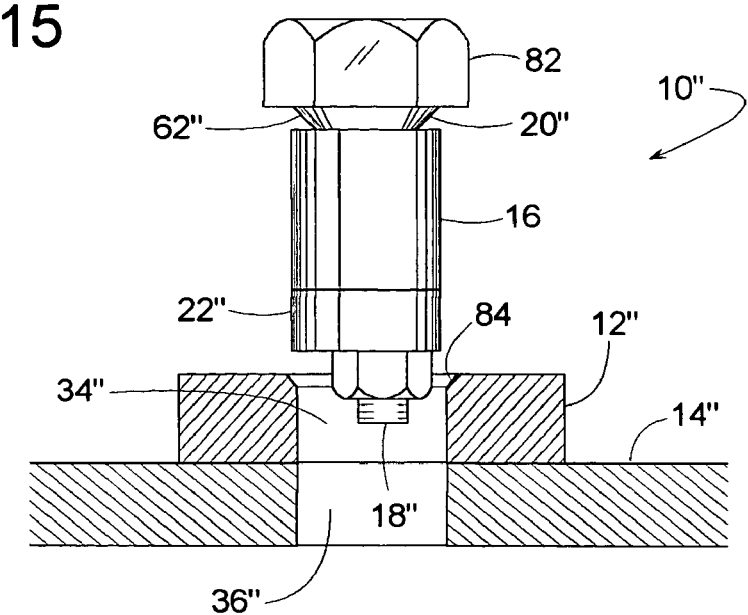
FIG. 15 is a front view similar to FIG. 2 but showing the fastener of FIG. 14.
Figure 16:
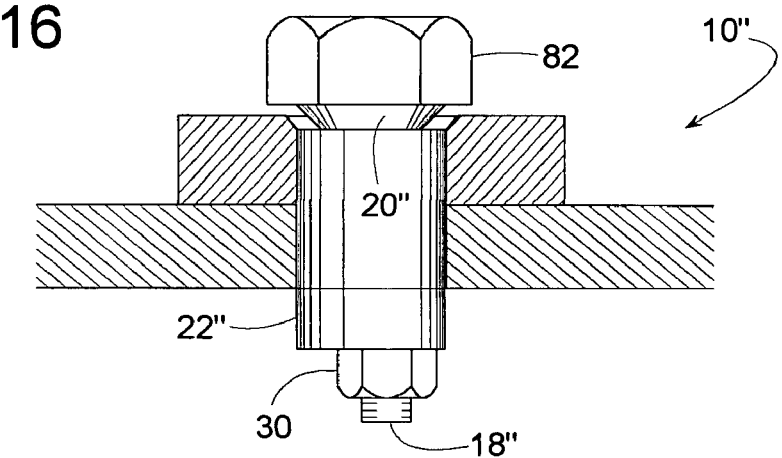
FIG. 16 is a front view similar to FIG. 3 but showing the fastener of FIG. 14 in a release position.
Figure 17:
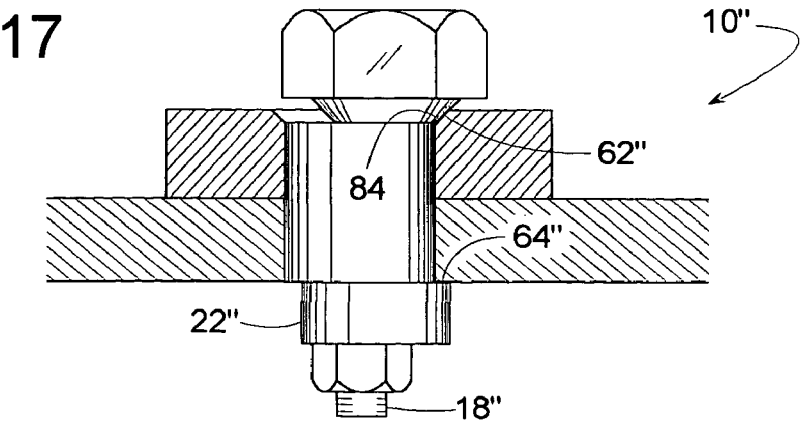
FIG. 17 is a front view similar to FIG. 4 but showing the fastener of FIG. 14 in a lock position.
Figure 18:
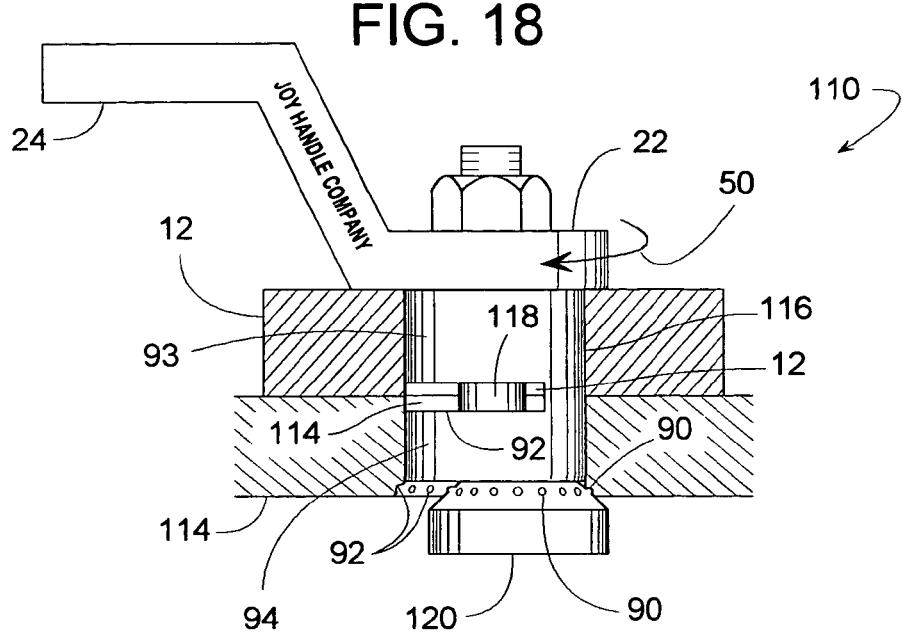
FIG. 18 is similar to FIG. 4 but showing another embodiment of a fastener in its lock position.
Figure 19:
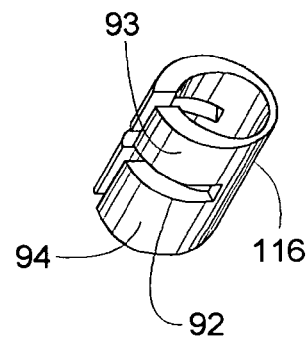
FIG. 19 is a perspective view of another embodiment of a radially expandable sleeve.
Figure 20:
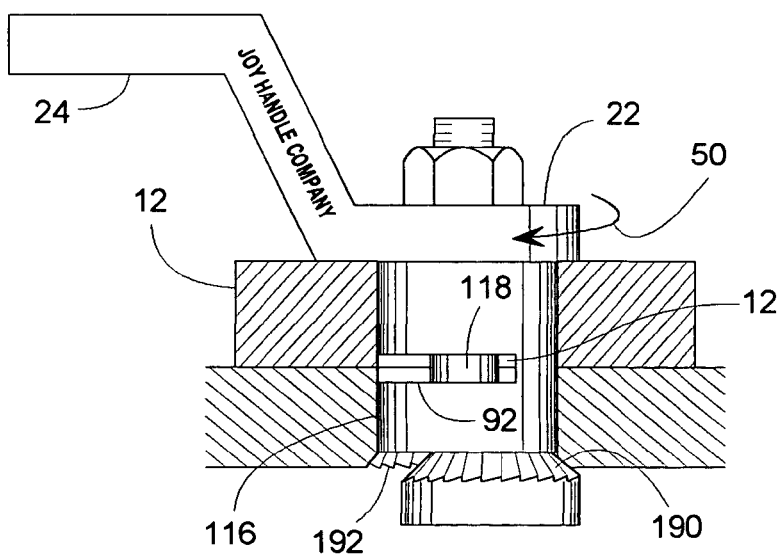
FIG. 20 is similar to FIG. 4 but showing another embodiment of a fastener in its lock position.

Cam surface 62' comprises a helical ramp 76 and a radial cam surface 78. Upon turning handle 24 of fastener 10', radial cam surface 78 pushes radially against the inside diameter of hole 36', which forces a shaft 18' to move form its release position of FIG. 12 to its clamp position of FIG. 13. Similar to sleeve 16, a sleeve 16' expands radially as shaft 18' moves from a wider end 54' of oblong hole 42' to a narrower end 56'.

In this example, sleeve 16' includes a neck 80 through which shaft 18' must pass to move between wider end 54' and narrower end 56'. Neck 80 provides a snap-into-position feel as fastener 10' is actuated between the release the lock positions. With neck 80, sleeve 16' and/or shaft 18' should be sufficiently flexible to enable shaft 18' to pass through neck 80 because the width of neck 80 is narrower than the outside diameter of shaft 18' and the widths of ends 54' and 56'. The flexibility can be achieved with proper material selection and/or by making shaft 18' hollow, whereby shaft 18' or sleeve 16' can deflect as shaft 18' passes through neck 80.

Another way of eliminating the need for chamfering the hole in a lower piece to be aligned and clamped is by inverting fastener 10. With some additional minor changes, inverting fastener 10 creates a modified fastener 10" as shown in FIGS. 14–17, which correspond to FIGS. 1–4 respectively. Fastener 10" is installed in a manner similar to that of fastener 10; however, clamp head 22" is lowered first into holes 34" and 36" of upper plate 12" and lower plate 14" respectively. A hex head 82, handle, or other gripping means is attached to a cam head 20" that has a cam surface 62". Once fastener 10" is in the release position of FIG. 16, hex head 82 allows cam head 20" to be readily turned, just as handle 24 turns clamp head 22.

Rotating hex head 82 forces cam head 20" radially against an upper edge 84 of piece 12". In reaction to that, shaft 18" moves from a release position of FIG. 16 to a clamp position of FIG. 17. More specifically, rotating cam head 82, shaft 18" and clamp head 22" forces shaft 18" to move from wider end 54 of opening 42 to narrower end 56. The diameter of shaft 18" is wider than narrower end 56, so slit 58 enables shaft 18" to expand sleeve 16 radially, as is the case with fastener 10. Again, the radial expansion of sleeve 16 is what accurately aligns holes 34" and 36". When shaft 18" is pressed into the narrower end 56 of opening 42, friction between shaft 18" and sleeve 16 helps hold fastener 10" in its clamped position.

In addition to the radial expansion of sleeve 16, the inclined cam surface 62" of cam head 20" pressing against upper edge 84 urges edge 84 to slide up along cam surface 62". This urges edge 84 to move closer to an axial clamping surface 64" of clamp head 22", whereby pieces 12" and 14" are axially clamped between cam surface 62" and axial clamping surface 64".

Other variations of the invention are shown in FIGS. 18–22. In these drawing figures and others, the three-digit numerals that identify various elements correspond to the two-digit numerals of the FIGS. 1–17, wherein 110 and 210 corresponds to 10, 112 corresponds to 12, 114 corresponds to 14, etc. Corresponding elements (e.g., handle 24 and 124) are elements that are quite similar in structure and function, but are not necessarily identical.

A fastener 110 (FIG. 18) can be provided with a plurality of irregularities 90 that engage a mating plurality of irregularities 92 in plate 114. The mating engagement of irregularities 90 and 92 helps hold fastener 110 in its clamped position. The structure of the irregularities can assume many shapes such as the protuberances and mating dimples of FIG. 18 or the mating serrations 190 and 192 of FIG. 20. The saw tooth serrations 190 and 192 may provide more permanent clamping than irregularities 90 and 92.

To accommodate slightly different hole diameters of plates 112 and 114, a sleeve 116 can be provided with a slit 92 that lies generally perpendicular to the sleeve's longitudinal centerline. Slit 92 lies between two axially offset portions 93 and 94 of sleeve 116. With slight bending of shaft 118, slit 92 allows portions 93 and 94 to expand independently of each other, so portion 93 can grip the inside hole diameter of plate 112, and portion 94 can grip the inside hole diameter of plate 114.

Figure 21:
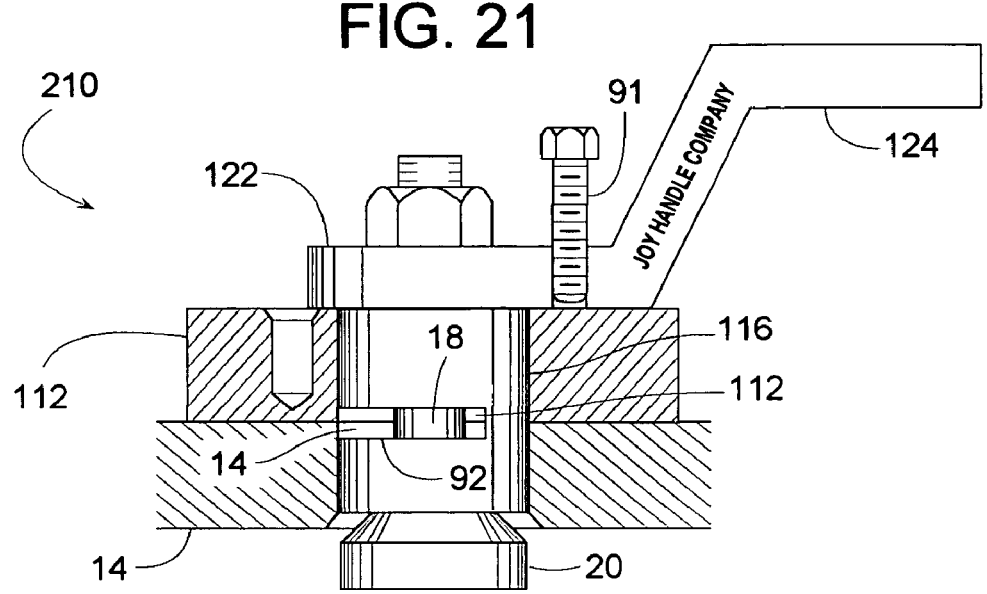
FIG. 21 is similar to FIG. 3 but showing another embodiment of a fastener in its release position.
Figure 22:
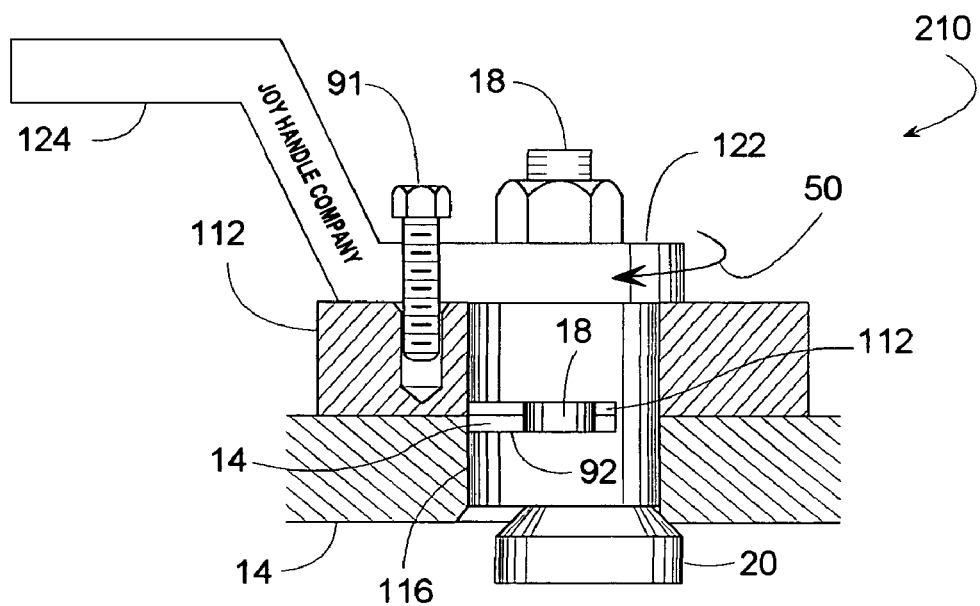
FIG. 22 is similar to FIG. 4 but showing another embodiment of a fastener in its lock position.

Another fastener 210 is illustrated in FIGS. 21 and 22, which correspond to FIGS. 3 and 4 respectively. Fastener 210 is similar to fastener 10 except sleeve 116 replaces sleeve 16, and fastener 210 includes a lock pin 91 that is axially movable relative to at least one of clamp head 122 and cam head 20. Lock pin 91 is movable between an unlock position of FIG. 21 and a lock position of FIG. 22. When in the lock position, pin 91 engages a hole in plate 112 to prevent handle 124 from moving relative to plate 112. Pin 91 can be a separate pin as shown, or pin 91 can be attached to handle 124 with just a nose portion of pin 91 being movable in and out of the hole in plate 112. Pin 91 represents any axially moving element that helps hold handle 124 fixed relative to plate 112. Examples of pin 91 include, but are not limited to, a screw, a smooth round pin, a spring-loaded pin, a spring-loaded ball plunger, etc.

Although the invention is described with respect to a preferred embodiment, modifications thereto will be apparent to those skilled in the art. Various features of the disclosed embodiments can be interchanged or used in combination with each other. Therefore, the scope of the invention is to be determined by reference to the claims, which follow.

I claim:

1. A fastener comprising:
    a shaft defining a shaft's longitudinal centerline;
    a cam head disposed at one end of the shaft and having a cam's longitudinal centerline that is radially offset to the shaft's longitudinal centerline;
    a clamp head disposed at an opposite end of the shaft, wherein the cam head and the clamp head are at opposite ends of the shaft; and
    a radially expandable sleeve having an outside diameter that defines a sleeve's longitudinal centerline, wherein the radially expandable sleeve defines an oblong opening through which the shaft extends, wherein the shaft is radially movable within the oblong opening between a release position and a clamp position, wherein the sleeve's longitudinal centerline is radially offset to the shaft's longitudinal centerline when the shaft is in the release position, wherein the outer diameter of the radially expandable sleeve increases in response to the shaft moving radially from the release position to the clamp position, and wherein the oblong opening, in a radial cross-sectional cut, has an oblong shape when the radially expandable sleeve is unexpanded.

2. The fastener of claim 1, wherein the radially expandable sleeve is rotatable to vary a radial offset between the sleeve's longitudinal centerline and the cam's longitudinal centerline.

3. The fastener of claim 1, wherein the cam head and the clamp head are spaced apart from each other at a substantially fixed distance.

4. The fastener of claim 1, wherein the radially expandable sleeve defines a slit that extends a full length of the radially expandable sleeve.

5. The fastener of claim 4, wherein the shaft is moves toward the slit as the shaft is moves from the release position to the clamp position.

6. The fastener of claim 1, further comprising a handle attached to the clamp head.

7. The fastener of claim 1, further comprising a handle attached to the cam head.

8. The fastener of claim 1, wherein the cam head includes an inclined cam surface that ties at an angle to the cam's longitudinal centerline.

9. The fastener of claim 1, wherein the cam head and the clamp head are substantially fixed relative to each other.

10. The fastener of claim 1, wherein the oblong opening has a shape that lies along an imaginary plane that is perpendicular to the sleeve's longitudinal centerline, wherein the shape has a narrower end and a wider end.

11. The fastener of claim 10, wherein the shape include a throat between the narrower end and the wider end, wherein the throat is narrower than the narrower end and the wider end.

12. The fastener of claim 1, further comprising an alignment mark disposed on at least one of the clamp head and the cam head, wherein the alignment mark helps align the radially expandable sleeve such that the fastener is in the release position.

13. The fastener of claim 1, wherein the radially expandable sleeve defines a slit that traverses the sleeve's longitudinal centerline and is interposed between two axially offset portions of the radially expandable sleeve, wherein the two axially offset portions are able to radially expand independently of each other.

14. The fastener of claim 1, further comprising a plurality of irregularities distributed circumferentially around the cam head, wherein the plurality of irregularities help hold the shaft in the clamp position.

15. The fastener of claim 1, further comprising a lock pin that is axially movable relative to at least one of the clamp head and the cam head, wherein the lock pin is movable between a lock position where the lock pin helps hold the shaft in the clamp position and an unlock position where the lock pin allows the shaft to move to the release position.

16. A method of clamping the fastener of claim 1 to a member, wherein the member defines a hole having an inner diameter, wherein the hole extends from a first surface of the member to a second surface of the member, the method comprising:

inserting the fastener into the hole so that the fastener engages the first surface, the second surface, and the inner diameter of the hole;

expanding the fastener radially outward against the inner diameter; and while expanding the fastener, simultaneously urging the first surface toward the second surface, wherein the step of expanding and simultaneously urging are achieved by rotating a portion of the fastener within the radially expandable sleeve that defines an oblong opening, in a radial cross-sectional cut, having an oblong shape when the radially expandable sleeve is unexpanded.

17. The method of claim 16, wherein the sleeve defines a slit that extends a full length of the sleeve.

* * * * *